(No Model.)

C. LA DOW.
HARROW.

No. 388,567. Patented Aug. 28, 1888.

Witnesses:

Inventor,
Charles La Dow,
By his Attorneys
Baldwin Davidson & Wight,

UNITED STATES PATENT OFFICE.

CHARLES LA DOW, OF ALBANY, NEW YORK.

HARROW.

SPECIFICATION forming part of Letters Patent No. 388,567, dated August 28, 1888.

Application filed July 27, 1888. Serial No. 281,175. (No model.)

*To all whom it may concern:*

Be it known that I, CHARLES LA DOW, of Albany, in the State of New York, have invented certain new and useful Improvements in Harrows, of which the following is a specification.

The organization, operation, and subject-matter claimed are fully set forth below.

Figure 1:
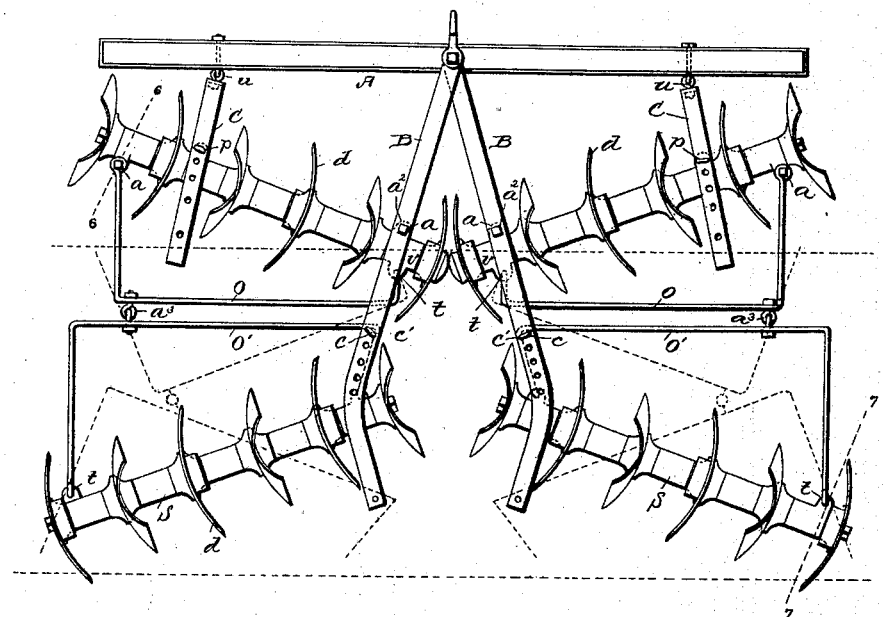
Figure 2:
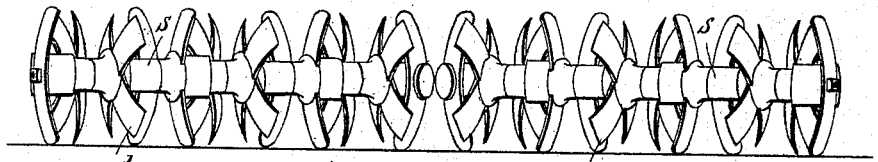
Figure 5:
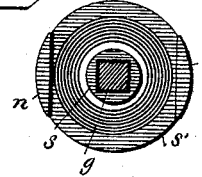
Figures 3, 4, 6, 7:
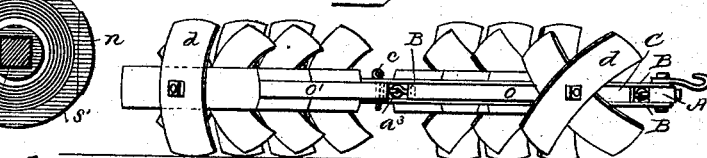

In the drawings, Figure 1 is a plan view; Fig. 2, a rear elevation; Fig. 3, a side elevation. Fig. 4 is a detail sectional view through the thimble or device for spacing the cutters on the shaft or gang-axle; Fig. 5, an end view of such a thimble, showing the square gang-axle in section. Fig. 6 is a section through a gang on the line 6 6 of Fig. 1, and Fig. 7 is a similar section on the line 7 7 of Fig. 1.

Each gang of cutters is shown as made up of a gang-axle, cutting-teeth, and spacing thimbles or spools. The axle $g$ is square, and passes through correspondingly-shaped openings in the teeth $d$ and spools S. The spools may be made in one piece, as indicated in the general views, or in sections S' S'', as shown in Fig. 4, and preferably have their ends shaped to conform to the teeth $d$. The teeth shown being curved and all those in a gang set in the same direction, the end faces of the spools are, as shown, made concave on one end and convex on the other. The ends of the spools are preferably constructed, as shown in Figs. 4 and 5, with a central hub, $s$, through which the gang-shaft passes, an outer flaring rim, $s'$, and an annular recess or space between the rim and hub, (indicated by the black spaces in Fig. 4.) This construction is light and strong and serves to firmly support the teeth at the middle and on each side.

The teeth which I prefer to employ are concave teeth of the general shape shown in the drawings, and are preferably clamped in the following manner: Each end of a spool is formed with opposite parallel lugs, $n$, on the rim $s'$, those on one end being arranged at right angles to those on the other, and the teeth fit snugly between them. The teeth are arranged in pairs, those in each pair preferably at right angles to each other, and each tooth is of course held against turning by the square shaft and the parallel lugs between which it lies. The lugs on the ends of the spools may be omitted. The gang being assembled, the cutters in each gang are clamped, so as to revolve together, by means of the nut on the end of the gang-shaft. Of course the gang-shaft might be stationary and the cutters revolve around it, either separately or as a gang. Four gangs are shown arranged in pairs, one pair in front of the other, with the gangs in each pair on the opposite sides of the central draft-line, and preferably radiating outward from one center, somewhat like four spokes in a wagon-wheel, so as to bring the gangs at angles to the line of draft.

The leading gangs have their cutters disposed to throw the earth from the center of the machine, their inner ends being preferably in contact and provided with buffer-heads to take the end-thrust, as is well understood. The teeth of the rear gangs are arranged to throw the earth toward the center of the machine, and consequently any part of the furrow left unfilled between the inner cutters of the leading gangs will be filled by these gangs and the earth left in smooth and even condition the entire width of the harrow. The draft and adjusting devices may be arranged as follows: A transverse draft-beam, A, which also serves as a guard-bar to protect the horses, is connected with the inner ends of the gang-beams by draft-rods B B, which are pivoted to the center of the beam A, and, diverging, extend rearwardly, and are connected with the leading gangs between the two inner cutters of each gang by bolts $a$, which pass through the bar and through an aperture, $a'$, in a lug, $a^2$, formed on one side of the sleeve $v$, which envelops the thimble S, Figs. 1, 4, and 6. The leading gangs are also connected with the beam A toward their outer ends by draft-links C, pivotally connected with the bar A by hinge-joints $u$, which permit both vertical and horizontal movement, and provided with series of apertures and locking pins or bolts $p$, which connect the gangs in the same manner as just described, and permit adjustment so that the gangs may be set at an angle relatively to the draft-line. To the rear of each leading gang a triangularly-shaped yoke, O, is connected. One end of each yoke is connected with the outer end of the gang by a pin, $a$, which engages the gang in the same manner described in connection with the rods B B, and as shown in Fig. 6. The other end of the yoke is preferably formed with an upwardly-curved hook, t, which engages an aperture, t', in a lug on a sleeve, T, between the two inner cutters of the gang. (See Fig. 7.) The rear gangs are equipped with similar angular yokes, O', which may be connected with both the inner and outer portions of the gangs by hook-connections t t, same as just described. The yokes O O' are preferably so related to the gangs that when the gangs are in the angular working position shown the long sides of the yokes of the front and rear gangs will be about parallel and about at right angles to the draft-line. Each pair of yokes O O' is connected by a universal hinge connection, $a^3$, which is preferably located, as shown, near the outer edges of the machine and near the angles of the yokes. The diverging draft-bars B B extend rearwardly beyond the leading gangs, are curved inwardly somewhat toward their ends, and are provided with series of apertures for the reception of locking-pins c, which engage the inner angle, c', of the yokes O O'. Other forms of draft-frames may be substituted.

As indicated in the side elevation, Fig. 3, the bars B B and C C may be double or bifurcated and pass above and below the gang-thimbles and the yokes, and be provided with corresponding apertures both above and below, to insure a secure connection when the pins a are dropped into place.

In the drawings the gangs are shown in full lines set at a working angle to the draft-line, while the dotted lines indicate the position the yokes would assume when the gangs are set at right angles to the draft.

From the above description it will be perceived that this harrow has four gangs, and that the right and left hand gangs on each side of the central draft-line are attached together, thus forming a section which may vibrate vertically independently of the opposite section, and in which the end-thrust of one gang in each section is counteracted by that of its mate. Thus the gangs always cut level and leave the soil in a smooth and uniform condition.

By withdrawing the pins a the draft of the team throws the gangs out of their angular working position into the position shown by the dotted lines, while the adjustment of the angle of the gangs is readily accomplished by setting the pins in the proper holes. The angular adjustment of the gangs may be omitted, or the manner of accomplishing it be varied.

It will be observed that the frame is supported solely by the cutters. The frame therefore not only holds the cutters in position, but also enforces their action.

From the above description it will be plain that many features of detail and general construction are not dependent upon the particular arrangement of parts shown, nor upon the form of teeth shown; but, on the contrary, other kinds or forms of teeth or cutters, either elastic or not, may be used, for the subject-matter claimed is independent of and unconnected with teeth or cutters of any special character; and the teeth may be mounted in a greater or less number of gangs and in different frames than those shown, and I do not therefore limit myself to the precise form of construction shown and described.

In another application, No. 247,549, filed August 22, 1887, I have shown a machine like that described herein; and I do not, therefore, claim any subject-matter claimed therein.

I claim as my invention—

1. In a harrow, leading gangs of revolving cutters set at angles to the draft and arranged to throw the earth outwardly, in combination with following gangs which throw the earth inwardly, whereby the furrow left between the leading gangs is filled by the following gangs, as set forth, the pair of gangs on each side of the draft-line being free to revolve and vibrate independently of the opposite pair.

2. In a harrow, the combination of four rotary gangs of cutters set at angles to the draft, the pair of gangs on each side of the central draft-line being disconnected from the opposite pair and arranged one in front of the other, and connected together by yoke-frames or equivalent devices, so as to form a section which may vibrate independently of the other section, substantially as set forth.

3. In a harrow, four gangs of revolving cutters set at angles to each other, the pair of gangs on each side of the central draft-line being arranged one in front of the other and to cut in reverse directions, whereby the end-thrust of one gang counteracts that of the other, in combination with yoking or equivalent mechanism, whereby said gangs in each pair are united to form a section which may vibrate independently of the other section.

4. The combination of draft devices and four gangs of rotary cutters set at angles to the draft, the pair on each side of the machine being arranged one in front of the other and to cut in reverse directions, whereby the end-thrust of one of said gangs counteracts that of the other, flexible connections between the front and rear gangs of each pair which permit their free vibration, and connections between each pair and the draft attachment of the machine, whereby each of said pairs of gangs forms a section of the harrow which is free to vibrate independently of the opposite section, and said cutters forming the sole support for their draft-frame.

5. The combination, with a draft beam or frame, of cutter-gangs arranged in pairs on each side of the draft-line, the gangs in each pair cutting in reverse directions and being placed one in front of another, and both connected to each other and to the draft beam or frame, said cutters supporting the draft-frame in which they are mounted.

6. The combination, with a draft beam or frame, of cutter-gangs arranged in pairs on each side of the draft-line, the leading gangs in the pairs being set to throw the earth from the center of the machine, and with their adjacent inner cutters in close proximity to each other, so as to cut a central furrow, and the rear gangs being set to throw the earth toward the center of the machine, and their adjacent inner cutters placed so as to throw the earth into said central furrow, said cutters supporting and guiding the frame in which each gang is journaled.

7. In a harrow, two vibratory pairs of gangs placed on opposite sides of a central draft-line, the gangs of each pair being placed one in front of another, cutting in reverse directions, and so arranged that the cutters of the rear gang cut out the spaces left between the cutters of the leading gang, in combination with a draft-frame mounted upon and supported by said cutter-gangs.

8. The combination, with a frame or draft-beam, of cutter-gangs supporting said frame and arranged in pairs on each side of the central draft-line, the gangs in each pair being placed one in front of another and adjustably connected with each other.

9. The combination, with a cross or draft beam arranged at right angles to the draft-line, of cutter-gangs in rear thereof supporting the draft-frame and arranged in pairs placed on each side of the draft-line, the gangs in each pair being arranged one in front of another and each connected to said cross-bar by an adjustable draft-connection.

10. In a harrow, the combination of pairs of cutter-gangs arranged on opposite sides of a central draft-line, the gangs of each pair being placed one in front of another and cutting in reverse directions, and each pair being capable of vibrating independently of the other pair, said cutter-gangs being weighted by the draft-frame to enforce their action.

11. In a harrow, the combination, with pairs of cutter-gangs arranged on opposite sides of the draft-line, the gangs of each pair being placed one in front of another, cutting in reverse directions and adjustably connected with each other, of devices for adjusting the angle of the gangs to the line of draft, said adjusting devices being supported by the cutter-gangs.

12. The combination, with a frame or draft devices, of revolving cutter-gangs arranged in pairs on opposite sides of the draft-line, each pair of gangs being capable of vertical vibration, but the individual gangs being incapable of vertical vibration.

13. The combination, with front and rear gangs, of interposed angular connecting frames or yokes O O', each having a long and short arm for connection with its gang.

14. The combination, with front and rear gangs and angular connecting frames or yokes O O', hinged or flexibly connected with each other and each having long and short arms for connection with its gang, of mechanism for adjusting the angles of the gangs.

15. In a harrow, the combination of a rigid transverse draft bar or frame, A, extending across the front of the machine, vibratory pairs of cutter-gangs in rear thereof arranged on opposite sides of a central draft-line, and adjustable draft-connections or draw-bars extending rearwardly from said transverse bar to each of said pairs of gangs, said gangs supporting the entire draft-frame.

16. The combination, with the cross or draft bar A, of cutter-gangs arranged in pairs on each side of the draft-line, the bars B B, connected with the cross-bar and each gang, the bars C C, connected with the cross-bar and the leading gangs, and connections between the front and rear gangs of each pair.

17. In a harrow without a pole and carrying-wheels, gangs of rotating cutters which support the harrow-frame, in combination with a transverse bar or guard arranged in front of the leading gangs, for the purpose set forth.

18. The combination of the front and rear gangs, the draft-arms B B and C C, connecting devices O O' between the front and rear gangs, and the adjusting and locking pins.

In testimony whereof I have hereunto subscribed my name.

CHARLES LA DOW.

Witnesses:
EDWARD C. DAVIDSON,
W. D. BALDWIN.